United States Patent [19]

Blakeman et al.

[11] Patent Number: 5,571,607

[45] Date of Patent: *Nov. 5, 1996

[54] THERMOPLASTIC THERMOFORMABLE COMPOSITE MATERIAL AND METHOD OF FORMING SUCH MATERIAL

[75] Inventors: David M. Blakeman, Westlake Village; Douglas R. Fitchmun, Woodland Hills; Niran Perera, Simi Valley, all of Calif.

[73] Assignee: Medical Materials Corporation, Camarillo, Calif.

[*] Notice: The term of this patent shall not extend beyond the expiration date of Pat. No. 4,778,717.

[21] Appl. No.: 285,062

[22] Filed: Aug. 3, 1994

Related U.S. Application Data

[62] Division of Ser. No. 731,640, Jul. 17, 1991, Pat. No. 5,354,604.

[51] Int. Cl.$^6$ .............................. B32B 27/04; B32B 7/00
[52] U.S. Cl. ..................... 428/246; 428/247; 428/213; 428/260; 428/282; 428/286; 428/290; 428/298; 428/307; 428/303; 428/332; 428/339
[58] Field of Search ................................... 428/246, 247, 428/260, 282, 286, 290, 298, 302, 303, 332, 339, 213

Primary Examiner—Patrick J. Ryan
Assistant Examiner—Richard C. Weisberger
Attorney, Agent, or Firm—Ellsworth R. Roston; Charles H. Schwartz

[57] ABSTRACT

A thermoplastic resin defines a core of a thermoformable thermoplastic composite material. The core is sufficiently thick to provide for a shaping of the composite material at an elevated temperature to any desired configuration. First and second layers of fabric material are disposed on opposite sides of the core. The fabric material may be formed of glass, carbon or aramid and may be formed from woven fibers, unidirectional or chopped fibers or random strand mats. The fabric layers have a thickness sufficient to impart strength and rigidity to the fabric material. Layers of a thermoplastic thermoformable resin material may be disposed on the layers of the fabric material. The thermoplastic layers impregnate the fabric layers, bond the fabric layers to the core and provide a smooth external surface to the composite material. The thermoplastic layers are of a sufficient thickness to maximize the flexural load strength of the composite material and to eliminate the formation of any rippling or buckling of the composite material. The core and the additional resin layers may be an acrylic, a polycarbonate or ABS. The core may be thicker than the combined thicknesses of the fabric layers and the thermoplastic layers. For example, each of the fabric layers may have a thickness in the order of eight mils (0,008") to nine mils (0,009"). The thickness of each of the thermoplastic layers may be in the order of seven mils (0,007") to nine mils (0.009"). The thickness of the thermoplastic composite material may be in the order of eighty five mils (0.085") to one hundred and twenty five mils (0. 125").

12 Claims, 3 Drawing Sheets

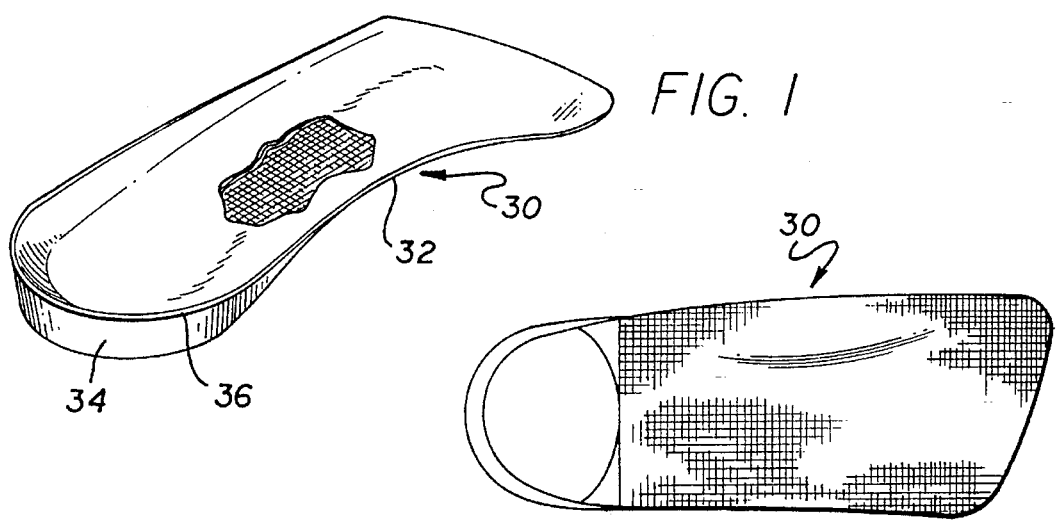
FIG. 1
FIG. 2
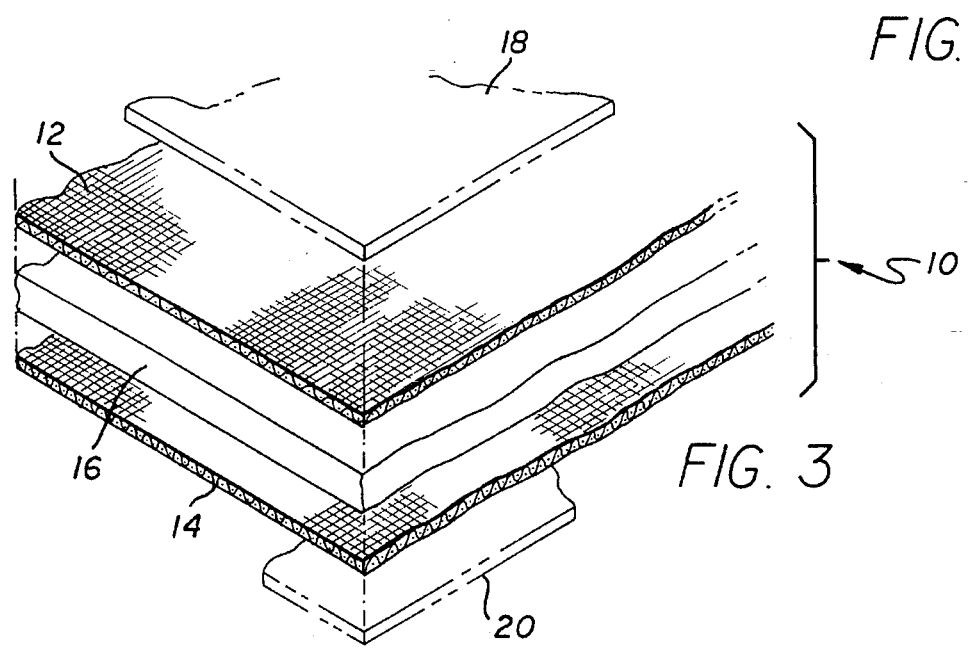
FIG. 3
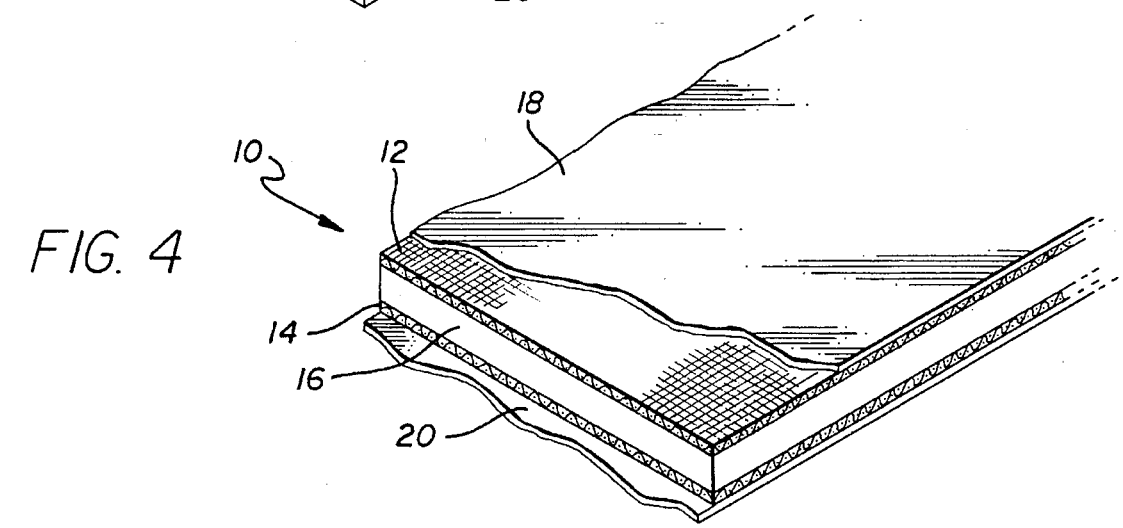
FIG. 4

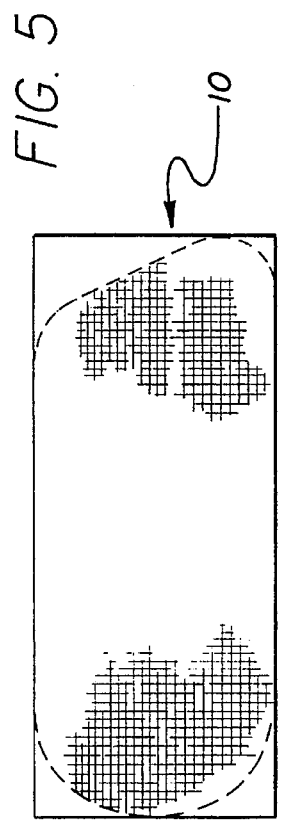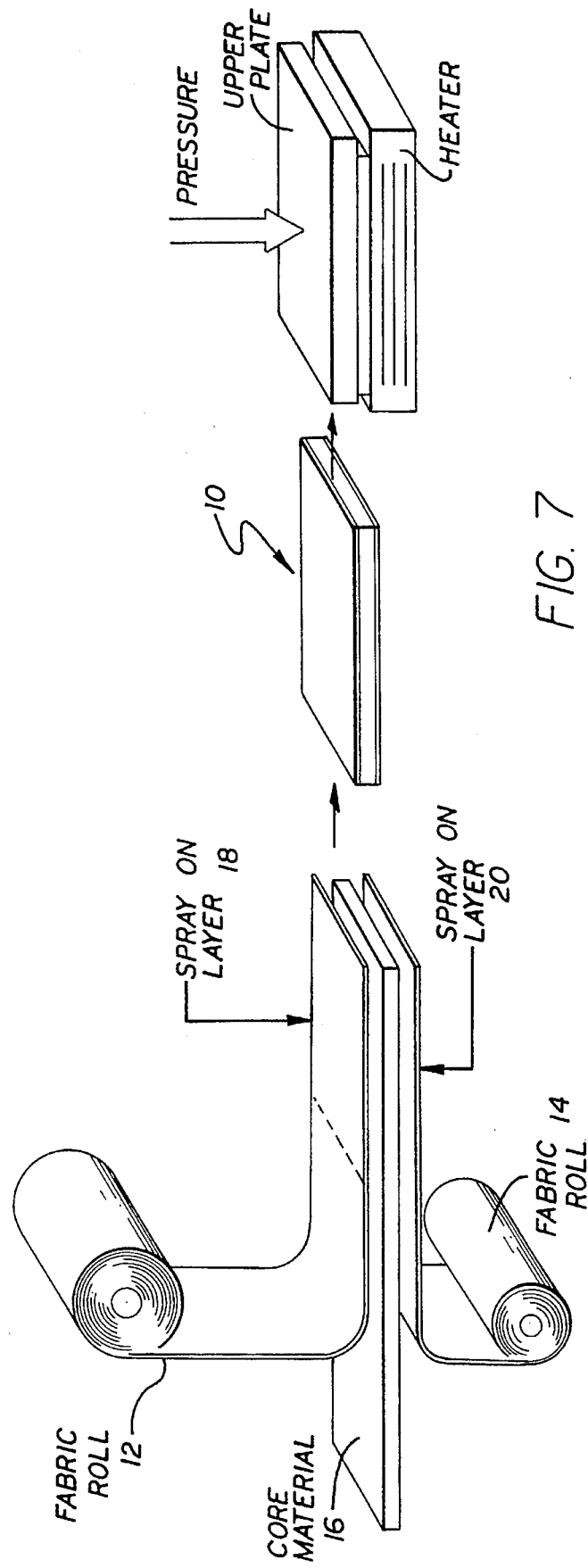

THERMOPLASTIC THERMOFORMABLE COMPOSITE MATERIAL AND METHOD OF FORMING SUCH MATERIAL

This is a division, of application Ser. No. 07/731,640, (now U.S. Pat. No. 5,359,604) filed Jul. 17, 1991.

This invention relates to a thermoformable thermoplastic composite material which is strong and light and which is capable of being thermally deformed to any desired shape without buckling or rippling of the composite material.

It is often desirable to form a sheet of plastic material into a complex shape without any rippling or buckling of the material. It is also desirable to make such sheet as light (from a weight standpoint), thin and strong as possible. It is also desirable to form a sheet with the above characteristics into the complex shape in a relatively simple process so that the costs of providing the complex shape in the sheet are low and so that the yield of the final product is high.

A sheet with the properties discussed may have a wide variety of different uses. For example, it may be shaped to conform to the shape of a foot. Alternatively, the sheet may be shaped to provide an arch support in a shoe. As another example, the sheet may be shaped to be disposed as a spring element in the sole of a wearer's shoe. Although the examples have been limited to uses in shoes, this is only one of a number of different fields or areas in which such material can be used.

Thermoplastic materials have been used to provide sheets with the properties discussed above. To obtain a desired shape, a mold is provided with the desired shape. The thermoplastic material is then formed into the desired shape by applying heat and pressure to the thermoplastic material to move the material into the mold and to have the material adopt the configuration of the mold. Suitable thermoplastic materials for forming into complex shapes may be any suitable thermoplastic material such as acrylics, polypropylenes and polyethylenes.

Thermoplastic materials are advantageous because they can be reshaped if it is desired to change the configuration somewhat after the material has been initially shaped through the application of heat and pressure. However, thermoplastic materials are distinctly disadvantageous in that they have to be provided with a considerable thickness in order to provide the necessary rigidity in such applications as orthotics. For example, thicknesses of 0.120" to 0.200" may be required. Unfortunately, such thick materials are heavy and are generally too thick to be disposed in foot gear. Furthermore, the thermoplastic materials are not as durable and resistant to breaking as would otherwise be required. The thermoplastic materials also sometimes buckle and ripple when they are transformed into complex shapes.

Thermosetting materials have also been used to provide complex shapes such as for footwear and orthotic applications. An advantage of a thermosetting material is that it can be made quite thin to obtain the desired shape. For example, the thickness of the thermosetting material may be in the order of 0.065" to 0.080". One problem with shaping thermosetting materials into complex shapes is that the thermosetting materials have to be shaped properly the first time. The reason is that the thermosetting materials cannot be reshaped after they have been heated to a temperature for initially shaping the material. This problem has severely limited the use of the thermosetting material to provide complex shapes. Another problem often is that the thermosetting material tends to be heavy even though it is thin.

Until recently, because of the problems discussed above for thermosetting materials, complex shapes such as for orthotic inserts have generally been formed from thermoplastic materials such as acrylics and polypropylenes. The orthotic inserts have been formed by initially making a plaster mold from the patient's foot. This plaster mold has formed a negative image of the patient's foot. A positive mold has then been made from the negative plaster mold. Thermoplastic material has then been transformed into the desired shape by using heat and pressure to conform the thermoplastic material to the positive mold.

U.S. Pat. No. 4,778,717 issued to me on Oct. 18, 1988, for a "Thermoplastic Thermoformable Composite Material" and assigned of record to the assignee of record of this application discloses and claims a composite thermoplastic material which can be easily formed, and even reformed if necessary, at elevated temperatures to any desired complex shape. The composite material is light and strong and is able to be thermally deformed, and even reformed, to any desired shape with relatively minimal buckling or rippling. U.S. Pat. No. 4,778,717 is made of reference to provide a background for the improvement constituting this invention and also to complete any disclosure in this application of the construction and formation of the composite material.

The composite material of U.S. Pat. No. 4,778,717 is formed from a core material of a thermoplastic resin material and a pair of layers of fabric material disposed on the opposite sides of the core material. Layers of a thermoplastic material envelope and impregnate the layers of the fabric material and bonds the layers of the fabric material to the core. The layers of the fabric material have a total thickness sufficient to impart strength and rigidity to the composite material. The core is of a sufficient thickness to provide for a shaping of the composite thermoplastic material at an elevated temperature to any desired shape or configuration with relatively little rippling or buckling of the fabric material. The composite material of U.S. Pat. No. 4,778,717 has received widespread acceptance for orthotics.

This invention provides a thermoplastic thermoformable composite material which constitutes an improvement over the composite material of U.S. Pat. No. 4,778,717. In one embodiment of the invention, a thermoplastic thermoformable resin material defines a core of a thermoformable thermoplastic composite material. The core is sufficiently thick to provide for a shaping of the composite material at an elevated temperature to any desired configuration.

First and second layers of fabric material are respectively disposed on opposite sides of the core. The fabric material may be formed of glass, carbon or aramid and may be formed from woven fibers, unidirectional or chopped fibers or random strand mats. The fabric layers have a total thickness sufficient to impart strength and rigidity to the composite material.

Layers of a thermoplastic thermoformable resin material may be disposed on the outer layers of the fabric material. The thermoplastic layers impregnate the fabric layers, bond the fabric layers to the core and provide a smooth external surface to the composite material. The thermoplastic layers are of a sufficient thickness to maximize the load to bend of the composite material and to eliminate the formation of rippling or buckling of the composite material.

The core may be preferably thicker than the combined thicknesses of the fabric layers and the thermoplastic layers. For example, each of the fabric layers may have a thickness in the order of eight mils (0.008") to nine mils (0.009"). The thickness of each of the thermoplastic layers may be in the order of seven mils (0.007") to nine mils (0.009"). The total thickness of the thermoplastic composite material may be in the order of eighty mils (0.080") to one hundred and twenty five mils (0.125").

IN THE DRAWINGS

FIG. 1 is a schematic perspective view, partially broken away, of a completed orthotic insert constructed from a thermoplastic thermoformable composite material in accordance with the teachings of this invention;

FIG. 2 is a bottom plan view of the orthotic insert of FIG. 1;

FIG. 3 is an enlarged exploded fragmentary schematic perspective view of the various materials used to form the thermoplastic thermoformable composite material constituting this invention;

FIG. 4 is a fragmentary schematic perspective view of the thermoplastic composite material of this invention in sheet form;

FIG. 5 is a bottom plan view illustrating a portion of the sheet material of FIG. 4 after trimming of the sheet material to a desired configuration but prior to the formation of the sheet material into the complex shape shown in FIGS. 1 and 2;

FIG. 6 is a bottom plan view illustrating the forming of the sheet material of FIG. 5 into the complex shape shown in FIGS. 1 and 2 but prior to the other steps to complete the orthotic insert shown in FIGS. 1 and 2;

FIG. 7 is a view schematically illustrating a method of forming the thermoplastic sheet material shown in FIG. 4;

Figure 9:
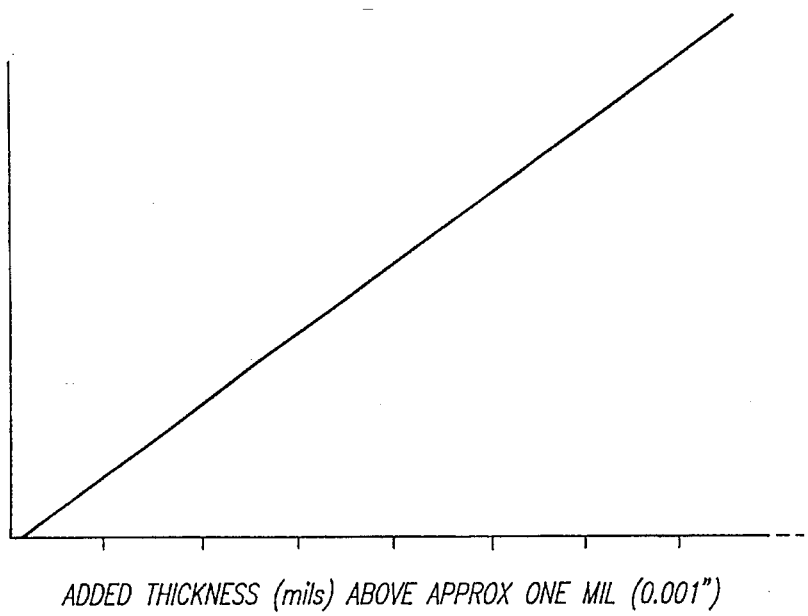
Figure 10:
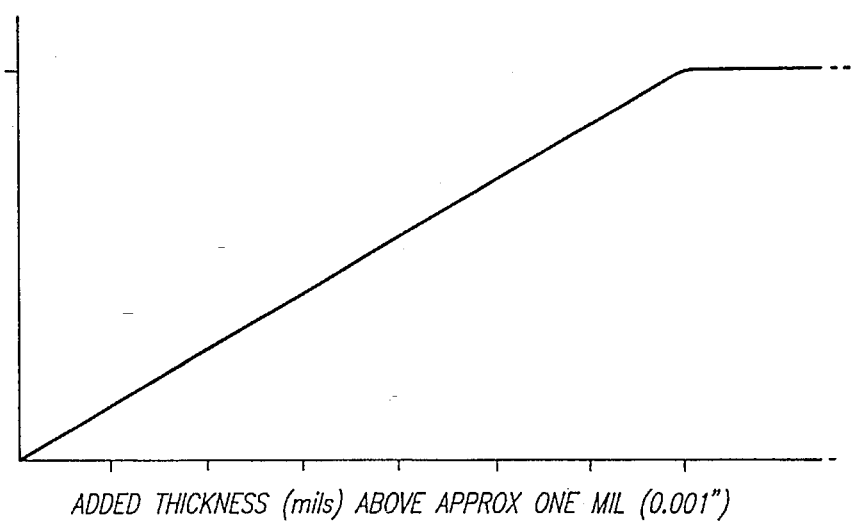

FIG. 9 is a graph schematically illustrating the relationship between the abrasion life of the composite material with progressively increased thicknesses of the layers of the thermoplastic material; and FIG. 10 is a graph schematically illustrating how instances of rippling and buckling of the composite material are progressively reduced to a value of zero (0) with progressively increased thicknesses of the layers of the thermoplastic material.

FIG. 4 illustrates a thermoplastic thermoformable composite material generally indicated at 10 and constituting one embodiment of this invention. The composite material 10 includes a pair of layers 12 and 14 of a fabric material, preferably woven. The material for the fabric layers 12 and 14 may be made from fibers of a suitable material such as carbon, glass or aramid or a combination of these materials. The layers 12 and 14 may be formed from woven fibers, unidirectional or chopped fibers or continuous random strand mats. It will be appreciated that other materials or combinations of materials may also be used. Each of the layers 12 and 14 may be relatively thin. For example, the layers 12 and 14 may have a suitable thickness in the order of eight thousandths of an inch (0.008") to nine thousandths of an inch (0.009").

The composite material 10 also includes a core 16 made from a suitable thermoplastic thermoformable material (a resin). A suitable resin may be an acrylic although other thermoplastic composite materials such as a polycarbonate or ABS may be used. The core 16 is disposed between the layers 12 and 14 of the fabric material. The thickness of the core 16 is preferably considerably greater than the total thickness of the layers 12 and 14 of the fabric material. For example, the total thickness of the core 16 and the layers 12 and 14 of the fabric material may be approximately seventy thousandths of an inch (0.070") when each of the layers 12 and 14 has a thickness in the order of 0.008" to 0.009".

As a first step in forming the composite material 10, the layer 12 of the fabric material is disposed against the core 16 on one side of the core. The layer 14 of fabric material is thereafter disposed against the core 16 on the other side of the core. As will be seen in FIG. 7, the layers 12, 14 and 16 may be disposed in the relationship described above by unwinding the core 16 and the layers 12 and 14 from rolls of material on a synchronized basis.

Although a preferred embodiment of the composite material has been described above, it will be appreciated that the thickness of the different layers of material can be varied through a wide range without departing from the scope of the invention. For example, the total thickness or volume of all of the different layers of fiber or fabric relative to the thickness of the core 16 may be between approximately five percent (5%) and one third (⅓). The thickness or volume of the layers 12 and 14 of the fiber or fabric relative to the total thickness of the composite material 10 is dependent upon the use to be made of the composite material. For example, when the composite material is to be used for an orthotic insert, the thickness of the layers 12 and 14 of fabric or fiber relative to the thickness of the core 16 in the composite material 10 may be approximately twenty five percent (25%) as described above.

Additional layers 18 and 20 (FIGS. 4 and 7) of a thermoplastic thermoformable resin material such as an acrylic may be respectively disposed on the layers 12 and 14 of the fabric material. The layers of the thermoplastic thermoformable resin material 18 and 20 respectively envelop and impregnate the layers 12 and 14 of fabric material. Each of the layers 18 and 20 preferably has a thickness in the order of seven mils (0.007") to nine mils (0,009"). Each of the layers 18 and 20 respectively envelopes and impregnates the contiguous layers 12 and 14 of fabric material and bonds the layers of fabric material to the core 16.

The material of the layers 18 and 20 of resin material may be the same as, or different from, the material of the core 16. However, if the material of the layers 18 and 20 is different from the material of the core 16, the different materials have to be compatible so that they will form a unitary whole when extruded or molded into the composite material 10.

As will be appreciated, the layers 18 and 20 of thermoplastic material are significantly thicker than corresponding layers of thermoplastic material in the thermoplastic composite material of U.S. Pat. No. 4,778,177. As will be described subsequently, this increased thickness in the layers 18 and 20 offers significant advantages in the thermoplastic composite material of this invention over the thermoplastic composite material of U.S. Pat. No. 4,778,177.

Figure 8:
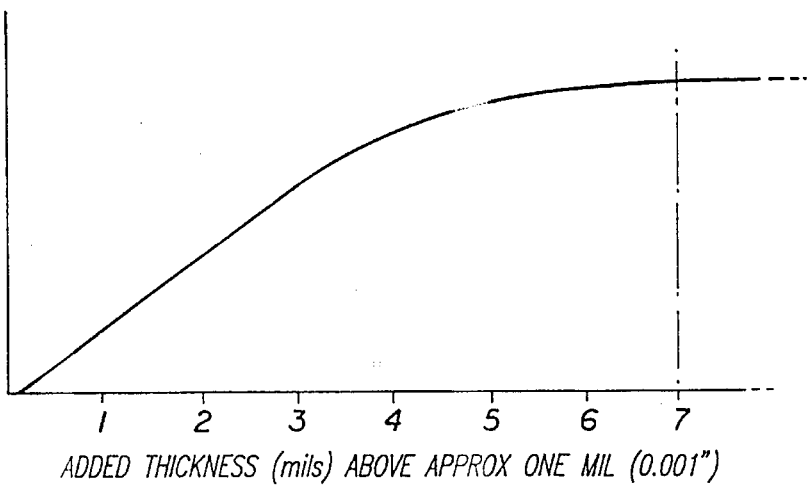
FIG. 8 is a graph schematically illustrating the relationship between the increase in the flexural strength of the thermoplastic composite material with progressively increased thicknesses of layers of the thermoplastic material in the composite material.

As shown in FIG. 8, the flexural load of the thermoplastic composite material increases linearly with increased thicknesses in the thermoplastic layers 18 and 20 until a thickness of approximately seven mils (0,007") in such layers. At such thicknesses and at increased thicknesses above a value of approximately seven mils (0.007") for each of the layers 18 and 20, the flexural strength of the thermoplastic composite material 10 remains substantially constant. This increased flexural strength is often important in such articles as arch supports for shoes since the arch supports are subjected to great flexural loads as a result of the weight of an individual wearing shoes with such arch supports and as a result of the forces imposed upon such arch supports when such individual walks or runs.

FIG. 10 illustrates the tendency of the thermoplastic composite material 10 to wrinkle or buckle when the material 10 is shaped at elevated temperatures to form an article such as an arch support in a shoe. As will be seen, the tendency of the material 10 to wrinkle or buckle in such shaping decreases with progressive thicknesses in the layers 18 and 20 of thermoplastic material until a thickness of approximately seven mils (0.007"). At such thicknesses and at thicknesses above seven mils (0,007"), there is no tendency for the thermoplastic composite material 10 to wrinkle or buckle when it is shaped at elevated temperatures.

It has been found that the layers of thermoplastic material covering the layers of fabric material in the thermoplastic composite material of U.S. Pat. No. 4,778,177 tends to wear when it is subjected to abrasion. For example, when the thermoplastic composite material is shaped into an arch support, the wearer's foot tends to force the outer layers of thermoplastic resin to be abraded by the shoe when the individual walks or runs. As shown in FIG. 9, the life of the outer layers of thermoplastic resin tends to increase linearly with progressive increases in the thickness of the layers. By providing each of the layers 18 and 20 with a thickness in the order of seven mils (0.007") to nine mils (0.009"), the life of the layers is significantly enhanced before the layers become worn by abrasion to expose the layers 12 and 14 of fabric material.

During the formation of the different layers of the fabric materials and the resin material into the composite material 10 as by laminating or molding the different layers, the additional layers 18 and 20 tend to facilitate the impregnation and encapsulation of the layers 12 and 14 of fabric material. Furthermore, they tend to cover the layers 14 and 16 of fabric material and provide a smooth external surface to these layers.

The layers 12 and 14 of the fabric material, the core 16 and the layers 18 and 20 of the thermoplastic material are then laminated into a thin sheet of the composite material at a suitable temperature and pressure as shown in FIG. 7.

FIG. 7 shows the additional layers 18 and 20 as being sprayed on the fabric layers 12 and 14. However, it will be appreciated that the layers 18 and 20 may be applied in different ways, such as in solid layers, on the fabric.

The particular temperature and pressure for providing the lamination of the different layers are dependent upon a number of parameters including the specific materials used for each of the layers 12, 14, 18 and 20 and the particular material used for the core 16. The particular temperature and pressure are also dependent upon the specific thickness of each of the layers 12, 14, 18 and 20 and the core 16 and the thickness of each of the layers relative to the thickness of the other layers. Although the formation of the composite material 10 by a laminating process is preferred, the composite material may also be suitably formed as by a molding process.

As an illustrative example, assume that the core 16 is approximately fifty thousands of an inch (0.050") thick and the composite material 10 is approximately eighty thousandths of an inch (0,080") thick. Further assume that the core 16 is an acrylic and the layers 12 and 14 of fabric material are made from a carbon woven fabric as described above. Under such circumstances, the composite material 10 may be initially laminated for a period of approximately two (2) to three (3) minutes at a pressure progressively increasing between zero pounds per square inch (0 psi) and ten pounds per square inch (10 psi). The composite material 10 may then be laminated for two (2) to three (3) minutes at a pressure progressively increasing to approximately ninety pounds per square inch (90 psi). The composite material may subsequently be laminated for approximately thirty (30) minutes at a pressure progressively increasing to a value in the range of three hundred to four hundred pounds per square inch (300–400 psi).

After the composite material 10 has been laminated as described in the previous paragraph, the composite material may be annealed. The annealing cycle may be dependent upon the parameters of the composite material such as those specified two (2) paragraphs previously. For example, under the circumstances described in the previous paragraph, an annealing cycle may be provided for a period of approximately sixty (60) hours. In this annealing cycle, the composite material may be annealed at a suitable temperature such as approximately 180° F. for a suitable period such as approximately ten (10) hours, then at a suitable temperature such as approximately 212° F. for a suitable period such as approximately eight (8) hours, then ramped to approximately 225° F. over a period of approximately ten (10) hours, then held at the temperature of approximately 225° F. for a period of approximately ten (10) hours, thereafter at a suitable temperature such as approximately 250° F. for a suitable period such as approximately four (4) hours and finally at a suitable temperature such as approximately 260° F. for the remaining period such as approximately eighteen (18) hours. The composite material 10 may then be cooled to ambient temperatures.

The annealing of the composite material 10 after the lamination of the composite material under heat and pressure offers certain important advantages. By annealing the composite material 10, moisture in the composite material 10 is eliminated. This prevents pockets of foreign material such as water from remaining in the composite material 10 after the formation of the composite material. Such foreign pockets are undesirable because they limit the ability of the composite material to be formed into complex shapes without rippling or bucking. The annealing of the composing material is also advantageous because it eliminates unreacted monomers and causes all of such unreacted monomers to be converted to polymers.

Although the thickness of the core 16 is preferably greater than the aggregate thickness of the layers 12 and 14 and the thermoplastic layers 18 and 20, it will be appreciated that the thickness of the core 16 may be equal to, or less than, the aggregate thickness of the other layers. For example, the thickness of the core 16 may be decreased below the thickness of the other layers when it is desired to provide the composite material 10 with compliant properties.

When the composite material 10 has been formed into sheets as described above and is thereafter to be converted into a complex shape, the material may be disposed in a mold having the desired shape and may be subjected to a suitable temperature and pressure to move the sheet into conformity with the shape of the mold. The composite material 10 has certain distinct advantages while it is being formed into the desired shape and after it has been so formed. During such formation, the layers 12 and 14 of the fabric material provide a body to the composite material. The core 16 provides for a movement between the layer 12 on one side of the core independently of the movement of the layer 14 on the other side of the core.

In this way, the composite material 10 can be formed into any desired shape without any rippling or buckling of the composite material or the fabric material. This is important in insuring that the composite material 10 will occupy only a minimal amount of space and will be comfortable to the user such as when it is formed into an orthotic insert. It is also important in insuring that the composite material 10 will have an optimal flexural strength, stiffness and rigidity after it has been formed into the desired shape.

The flexural load, stiffness and rigidity of the composite material 10 may be controlled dependent upon the total thickness of the layers 12 and 14 of the fabric material relative to the total thickness of the composite material. For example, as the total thickness of the layers 12 and 14 of the fabric material increases relative to the total thickness of the composite material 10, the stiffness, load and rigidity of the composite material 10 tend to be enhanced while the ability of the composite material to be conformed to complex shapes tends to be reduced. When the composite material 10 is formed as described above, the thermoplastic material of the layers 18 and 20 encapsulates and impregnates the fabric or fibers in the layers 12 and 14 of the fabric material and bonds the fabric or fibers to the core 16.

FIGS. 1 and 2 schematically show an orthotic insert generally illustrated at 30. The orthotic insert includes a base member 32 which is made from the composite material 10 and which is transformed to the desired shape after being provided in sheet form. A heel portion 34 is attached to the base member 32. The heel portion 34 may be made in a conventional manner. The heel portion 34 may be molded from a rigid plastic material to operate as a heel support. A soft durable covering 36 covers the base member 32. The soft durable covering material 36 may be made from any suitable leather-like material to provide for a comfortable surface adjacent the foot of the orthotic user.

FIG. 1 also illustrates that the base member 32 formed from the composite material 10 has a complex shape conforming to the bottom surface of the foot of the user of the orthotic insert 30. Each such orthotic insert 30 has to be made for an individual user because of its complex shape. In general, such orthotic inserts are provided by medical personnel who specialize in fitting such inserts to a user to provide the proper support to the user during various activities.

Typically, plaster molds of the user's feet are made and sent to a laboratory. The laboratory then makes castings from the molds. The castings thereby represent the bottoms of the user's feet. Orthotic inserts are then formed to provide for the proper inserts conforming to the bottom of the user's feet. These orthotic inserts constitute finished products. However, it is important that these orthotic inserts be post formable so that adjustments in their shape can be made in the field if there are any problems with the inserts after the inserts have been applied to the user's feet. The formation of the base member 32 from the composite material 10 allows for such post forming.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A thermoplastic thermoformable composite material, including, a sheet of a thermoplastic material defining a core and having first and second opposite surfaces, a first layer of a fabric material disposed on the first surface of the core, a second layer of a fabric material disposed on the second surface of the core, a first layer of a thermoplastic material disposed on the first layer of the fabric material and impregnating the first layer of the fabric material and bonding the first layer of the fabric material to the core, a second layer of a thermoplastic material disposed on the second layer of the fabric material and impregnating the second layer of the fabric material and bonding the second layer of the fabric material to the core, the layers of the fabric material and the layers of the thermoplastic material having relative thicknesses providing for the shaping of the composite material at elevated temperatures without any rippling or buckling of any of the layers and to impart strength and rigidity to the thermoplastic composite material and to maximize the flexural load of the thermoplastic composite material.

2. A thermoplastic thermoformable composite material as set forth in claim 1 wherein the thermoplastic material for the core and for the first and second layers are made from materials selected from the group consisting of acrylic, polycarbonate and ABS.

3. A thermoplastic thermoformable composite material as set forth in claim 1 wherein the first and second layers of fabric material are selected from the group consisting of carbon, glass and aramid and are further selected from the group consisting of woven fibers, unidirectional and chopped fibers and random strand mats.

4. A thermoplastic thermoformable composite material, including, a sheet of a thermoplastic material defining a core and having first and second opposite surfaces, a first layer of a fabric material disposed on the first surface of the core, a second layer of a fabric material disposed on the second surface of the core, a first layer of a thermoplastic material disposed on the first layer of the fabric material and impregnating the first layer of the fabric material and bonding the first layer of the fabric material to the core, a second layer of a thermoplastic material disposed on the second layer of the fabric material and impregnating the second layer of the fabric material and bonding the second layer of the fabric material to the core, the layers of the fabric material and the layers of the thermoplastic material having relative thicknesses providing for the shaping of the composite material at elevated temperatures without any rippling or buckling of any of the layers, for imparting strength and rigidity to the composite material and for maximizing the flexural load to bend the composite material, the first and second layers of thermoplastic material having a thickness in the order of approximately seven mils (0.007") to nine mils (0.009").

5. A thermoplastic thermoformable composite material as set forth in claim 4 wherein the thermoplastic materials for the core and for the thermoplastic layers are obtained from the group consisting of acrylic, polycarbonate and ABS.

6. A thermoplastic thermoformable material as set forth in claim 1, the thermoplastic material being the only material in the first and second layers of thermoplastic material.

7. A thermoplastic thermoformable material as set forth in claim 24, the thermoplastic materials for the core and for the thermoplastic layers being obtained from the group consisting of acrylic, polycarbonate and ABS.

8. A thermoplastic thermoformable as set forth in claim 4 wherein the first and second layers of fabric material are selected from the group consisting of carbon, glass and aramid and are further selected from the group consisting of woven fibers, unidirectional and chopped fibers and random strand mats.

9. A thermoplastic thermoformable composite material having properties of being shaped into a complex nonplanar form without rippling or buckling, including, a core of a thermoplastic material formed as a sheet with a thickness in a range of approximately 0.008" to approximately 0.020", layers of a fabric material respectively positioned at opposite sides of the core of the thermoplastic material with a thickness in a range of approximately 0.008" to 0.009", and additional layers of a thermoplastic material bonding the layers of the fabric material to the core and enveloping and impregnating the layers of the fabric material with a thickness in a range of approximately 0.007" to approximately 0.009" to provide for a shaping of the thermoplastic thermoformable composite material into the complex non-planar form without any wrinkles in the thermoplastic thermoformable composite material and to provide for a maximizing of the flexural load of the thermoplastic thermoformable composite material after such shaping and to impart strength and rigidity to the thermoplastic composite material, the thermoplastic material in the additional layers being the same as or compatible with the thermoplastic material in the core, the layers of the fabric material producing a stiffness and rigidity of the thermoplastic thermoformable composite material after such shaping, the core of the thermoplastic thermoformable composite material providing for a shaping of the composite material into the complex form.

10. A thermoplastic thermoformable composite material as set forth in claim 9 wherein the thermoplastic core and the additional layers of the thermoplastic material are made from a material selected from the group consisting of an acrylic, a polycarbonate and ABS.

11. A thermoplastic thermoformable composite material as set forth in claim 9 wherein the thermoplastic core is made from a material selected from the group consisting of an acrylic, a polycarbonate and ABS.

12. A thermoplastic thermoformable composite material as set forth in claim 9 wherein the layers of the fabric material are selected from the group consisting of carbon, glass and aramid.

* * * * *